(12) United States Patent
Kuiri

(10) Patent No.: US 7,062,248 B2
(45) Date of Patent: Jun. 13, 2006

(54) DIRECT CONVERSION RECEIVER HAVING A LOW PASS POLE IMPLEMENTED WITH AN ACTIVE LOW PASS FILTER

(75) Inventor: Tapio Kuiri, Oulu (FI)

(73) Assignee: Nokia Corporation, Espoo (FI)

( * ) Notice: Subject to any disclaimer, the term of this patent is extended or adjusted under 35 U.S.C. 154(b) by 527 days.

(21) Appl. No.: 10/345,659

(22) Filed: Jan. 16, 2003

(65) Prior Publication Data

US 2004/0142674 A1    Jul. 22, 2004

(51) Int. Cl.
*H04B 1/26* (2006.01)
(52) U.S. Cl. .................. 455/334; 455/313; 375/297; 375/318
(58) Field of Classification Search ............ 455/334, 455/339, 341, 550.1, 130, 138, 141, 164.2, 455/200.1, 219, 232.1, 234.1, 255, 260, 269
See application file for complete search history.

(56) References Cited

U.S. PATENT DOCUMENTS

| | | | |
|---|---|---|---|
| 6,654,595 B1 * | 11/2003 | Dexter ....................... | 455/323 |
| 6,738,601 B1 * | 5/2004 | Rofougaran et al. ........ | 455/66.1 |
| 6,753,727 B1 * | 6/2004 | Magoon et al. ............. | 330/9 |
| 6,807,406 B1 * | 10/2004 | Razavi et al. ............... | 455/313 |
| 2002/0058491 A1 * | 5/2002 | Minnis et al. .............. | 455/323 |
| 2004/0106380 A1 * | 6/2004 | Vassiliou et al. ............ | 455/73 |

OTHER PUBLICATIONS

"A 1.5 GHz Highly Linear CMOS Down Conversion Mixer", IEEE Journal of Solid State Circuits, J. Crols et al., vol. 30, No. 7, Jul. 1995, pp. 736-742.

"CMOS RF Circuits for Data Communications Applications", IEEE Journal of Solid-State Circuits, B. Song, vol. SC-21, No.: 2, Apr. 1986, pp. 310-317.

"Analysis and Realization of a Downconverting Quadrature Sampler", University of Oulu, Department of Electrical Engineering, K. Sami 2001 (Thesis).

* cited by examiner

Primary Examiner—Edward F. Urban
Assistant Examiner—Thuan T Nguyen
(74) Attorney, Agent, or Firm—Harrington & Smith, LLP

(57) ABSTRACT

A wireless communications mobile station (10) includes at least one antenna (240) and a RF transceiver (210,220) containing a direct conversion receiver (1) coupled to the antenna. The direct conversion receiver contains a low noise amplifier (3) for amplifying a received RF signal and for outputting the amplified RF signal to a current switching down-conversion mixer (4). The down-conversion mixer has a first input node for receiving the amplified RF signal, a second input node for receiving a local oscillator (LO) signal for mixing with the amplified RF signal and an output node coupled to an input of an operational amplifier forming a low pass filter (5A). In accordance with an aspect of this invention the low pass filter has a low pass pole generated by a resistor R and a capacitor C coupled in parallel in a feedback path of the operational amplifier, where a low pass comer frequency of the low pass filter is inversely proportional to the product of R and C. In a preferred embodiment at least the down-conversion mixer and the low pass filter are implemented as part of an integrated circuit, and the resistor and the capacitor are fabricated within the integrated circuit.

20 Claims, 6 Drawing Sheets

US 7,062,248 B2

DIRECT CONVERSION RECEIVER HAVING A LOW PASS POLE IMPLEMENTED WITH AN ACTIVE LOW PASS FILTER

TECHNICAL FIELD

The teachings of this invention relate generally to radio frequency (RF) receivers and, more specifically, relate to direct conversion RF receivers and to mixers used with direct conversion RF receivers.

BACKGROUND

Direct conversion RF receivers, or more simply direct conversion receivers (DCRs), have been found to be attractive for use in mass produced consumer communication products such as cellular telephones and personal communicators. This is due to the fact that the DCR has a relatively simple structure (as compared to the conventional heterodyne or superheterodyne type of receiver), a reduced component count, and enables a high level of circuit integration to be achieved. The DCR is so-named because the received RF frequency is down-mixed or down-converted directly to a DC baseband signal, or to a very low frequency baseband signal, without undergoing one or more stages of intermediate frequency (IF) down-mixing.

FIG. 1 is a simplified schematic diagram that illustrates a prior art example of a DCR 1 used for receiving a modulated RF input signal and downconverting it to in-phase (I) and quadrature (Q) baseband signals. The DCR 1 includes an input RF passband filter 2, a low noise amplifier (LNA) 3 and I and Q channels or branches each containing a down-conversion mixer 4, a low pass filter (LPF) 5, an automatic gain control (AGC) block 6, a second LPF 7 and an analog to digital converter (ADC) 8. The mixing frequency input to the I and Q mixers is supplied by a local oscillator (LO) 9 containing a phase locked loop (PLL) 9A, a voltage controlled oscillator (VCO) 9B, a buffer amplifier 9C and possibly a divider 9D. The divider 9D may also conveniently provide the desired ninety degree phase shift between the LO signals input to the I and Q branch mixers 4. The LO signal is typically equal to (or very near to) the center frequency of the RF input signal (note that the instantaneous frequency of the RF input signal can differ from the LO frequency due to modulation).

It is important to low pass filter the down-converted signal as soon as possible after the mixers 4, otherwise the signal will exhibit linearity and compression-related problems upon further amplification. This is due to adjacent channel signal that may be at a higher level than the desired channel (own channel) signal. The use of low pass filtering serves to attenuate the adjacent channel signals, thereby allowing for additional amplification of the own channel signal. This type of operation is typically referred to in the art as channel filtering.

FIG. 2A is a simplified schematic diagram of a prior art embodiment of the mixer 4 and first LPF 5 of FIG. 1 (a Gilbert Cell mixer). For the purposes of this discussion it does not matter whether the I branch or the Q branch circuitry is illustrated. Note that differential signals and circuitry are illustrated and are assumed to be used. The differential RF input signal from the LNA 3 is applied to a pair of transconductors 4A and 4B. The outputs of transconductors 4A and 4B are coupled to a switch pair (SW1, SW2) that also receives the LO signal. Common mode DC and input signal dependent differential currents, produced by the transconductors 4A and 4B, are alternated to the output loads according to the LO signal, thereby causing downconversion. The currents are converted to voltages in resistors R1 and R3 (R1 is typically equal to R3). However, conversion results at a high frequency are attenuated in the low pass filter formed by R1, R3 and C1 (LPF 5). The output is connected to the next stage, shown as the AGC block 6 in FIG. 1.

In the illustrated prior art design for the LPF 5 the low pass corner frequency is given by $1/(2\pi(2(R1*C1))$, assuming that R1=R3. However, the ohmic value of R1 and R3 cannot be made large as an undesirable large DC voltage drop will result. This is true because R1 and R3 are in series with the mixer 4 and the DC power supply, and the mixer DC current ($I_{DC}$) flows through R1 and R3. The conventional solution instead increases the value of C1. This solution, however, creates a problem when it is desired to fabricate the DCR in an integrated circuit form, as the required large value of capacitance for C1 correspondingly requires a substantial amount of integrated circuit area to implement. An alternative solution is to make C1 an external discrete component, but this approach requires that additional integrated circuit pins be provided, and thus adds cost, increases fabrication/testing complexity, and introduces a possible interference source and imbalance due to pin-related parasitics.

FIG. 2B shows a conventional Low Pass Filter (LPF) 5' constructed using an active component, i.e., an operational amplifier (op amp), while FIG. 2C shows the roll-off in gain as a function of frequency. Note that the input (voltage mode) is applied through R1 and R3.

Reference may be had to a publication entitled: "A 1.5 GHz Highly Linear CMOS down conversion mixer", IEEE Journal of Solid State Circuits, J. Crols et al., Vol. 30, No. 7, July 1995. This publication describes a CMOS mixer topology that uses two additional capacitors added to the conventional CMOS lowpass filter structure, enabling GHZ signals to be processed while using a low frequency operational amplifier (op amp) as an output amplifier.

Reference can also be made to B. Song, "CMOS RF Circuits for Data Communications Applications", IEEE Journal of Solid-State Circuits, Vol. SC-21, No.: 2, April 1986, pps. 310–317, for showing a triode low pass mixer.

SUMMARY OF THE INVENTION

The foregoing and other problems are overcome by methods and apparatus in accordance with embodiments of this invention.

A wireless communications mobile station includes at least one antenna and a RF transceiver containing a direct conversion receiver coupled to the antenna. The direct conversion receiver contains a low noise amplifier for amplifying a received RF signal and for outputting the amplified RF signal to a down-conversion current-switching mixer, which could be implemented as a bipolar mixer. The down-conversion mixer has a first input node for receiving the amplified RF signal, a second input node for receiving a local oscillator signal for mixing with the amplified RF signal and an output node coupled to virtual ground of an operational amplifier, which forms a low pass filter.

In accordance with an aspect of this invention the operational amplifier has a low pass pole generated by a resistor R and a capacitor C coupled in parallel in a feedback path of the operational amplifier, where a low pass corner frequency of the low pass filter is inversely proportional to the product of R and C.

In a preferred embodiment at least the down-conversion mixer and the low pass filter are implemented as part of an integrated circuit, and the resistors and the capacitors are fabricated within the integrated circuit, thereby reducing component count and cost while increasing reliability.

In a preferred embodiment the direct conversion receiver has an in-phase (I) branch and a quadrature (Q) branch following the low noise amplifier, and each of the I and Q branches are constructed to contain one of the down-conversion mixers and one of the low pass filters.

A method of operating a direct conversion receiver integrated circuit in accordance with this invention includes amplifying an input RF signal; down-converting the amplified RF signal to a down-converted signal using a mixer having an input transconductor stage for receiving the amplified RF signal and a mixer core. The mixer processes the RF signal in the current mode and processes a local oscillator signal in the voltage mode, and the method low pass filters the down-converted signal with an active low pass filter having a low pass pole generated by an amplifier having a resistor R and a capacitor C coupled in parallel in a feedback path of the amplifier. A low pass corner frequency of the low pass filter is inversely proportional to the product of R and C.

In a still further aspect this invention provides a receiver circuit for use in a mobile station, such as a cellular telephone or a personal communicator. The receiver circuit includes a Gilbert Cell mixer that receives an RF signal to be mixed with a local oscillator signal. The Gilbert Cell mixer has first and second outputs connected to first and second inputs, respectively, of an operational amplifier for providing input signal dependent differential currents $i_{diff}$ to the first and second inputs of the operational amplifier. The first and second inputs of the operational amplifier are connected to a supply voltage through first and second resistances, respectively, and receive common mode currents $I_{DC}$ therefrom. The operational amplifier has a first parallel RC network coupled between a first output node of the operational amplifier and the first input, and has a second parallel RC network coupled between a second output node of the operational amplifier and the second input. The operational amplifier and the first and second parallel RC networks form a low pass filter at the first and second outputs of the Gilbert Cell mixer. The first and second outputs of the Gilbert Cell mixer are connected to virtual ground nodes of the operational amplifier.

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIG. 2B shows a conventional Low Pass Filter (LPF), while

DETAILED DESCRIPTION OF THE PREFERRED EMBODIMENTS

Figure 3:
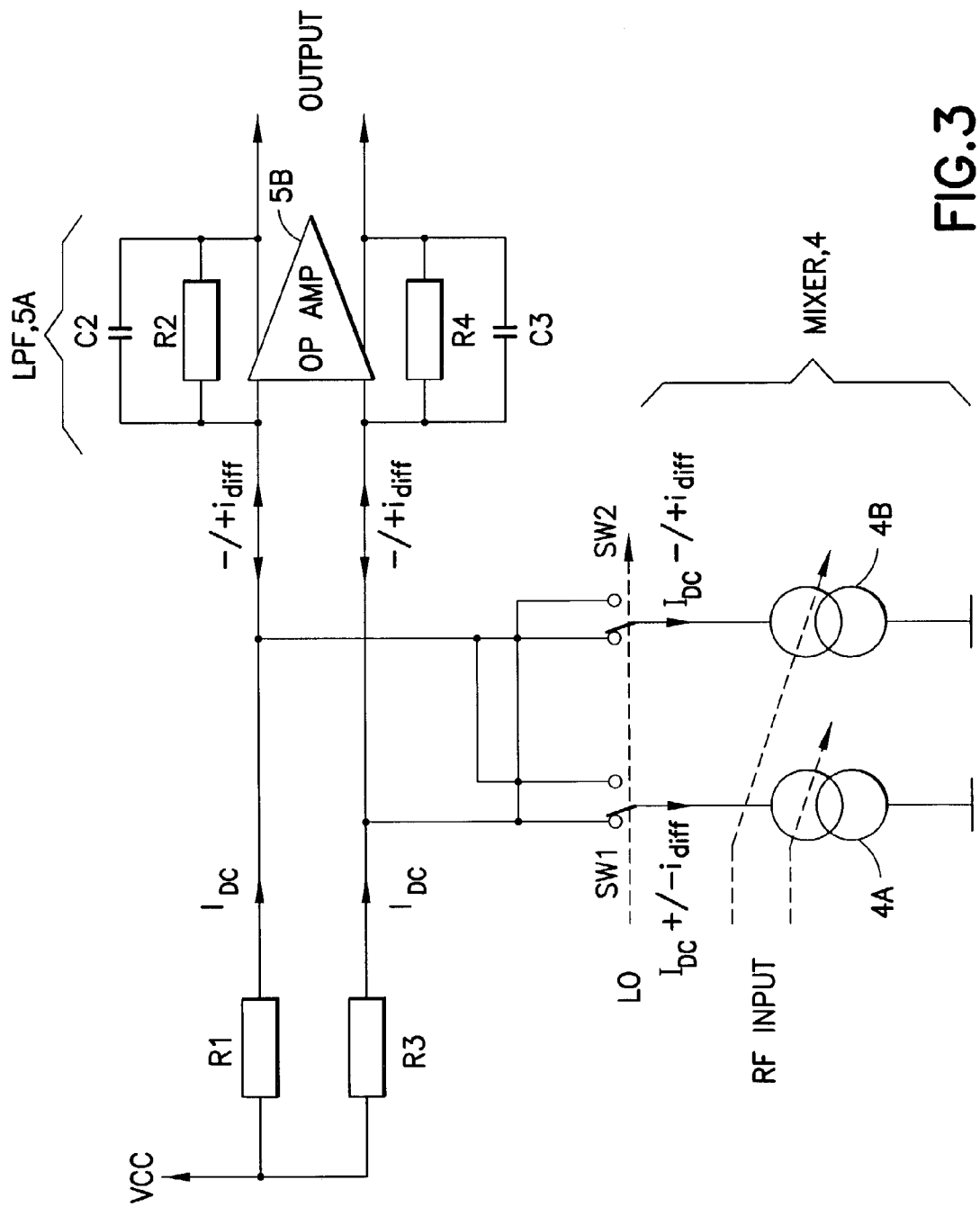
FIG. 3 is a simplified schematic diagram of an embodiment of the mixer and low pass filter in accordance with the teachings of this invention.

Reference is now made to FIG. 3 for showing a simplified schematic diagram of an embodiment of the mixer 5 and an improved low pass filter 5A in accordance with the teachings of this invention. The output currents from the mixer core 4 are connected to the virtual ground node of the operational amplifier (op amp) 5B. Because of feedback both inputs to the op amp 5B are at the same DC potential, and differential currents are forced to go through the feedback circuitry. However, common mode DC currents can also be supplied by R1 and R3. This is preferred, as it means that the corner frequency of the low pass pole is not affected by the values of R1 and R3. As such, their values can be made small, thereby producing a low DC voltage drop from the supply voltage VCC.

In this embodiment the low pass pole of the LPF is implemented not by the passive LP filter comprised of R1, R3 and C1, but instead by an active LP filter comprised of the operational amplifier 5B in combination with the paralleled feedback components R2/C2 and R4/C3. The values of R2 and R4 are thus not limited by the DC voltage drop caused by DC currents, and they can therefore be made larger in value. Consequently, the value of C2 and C3 can be less than the capacitance value of C1.

Figure 2A:
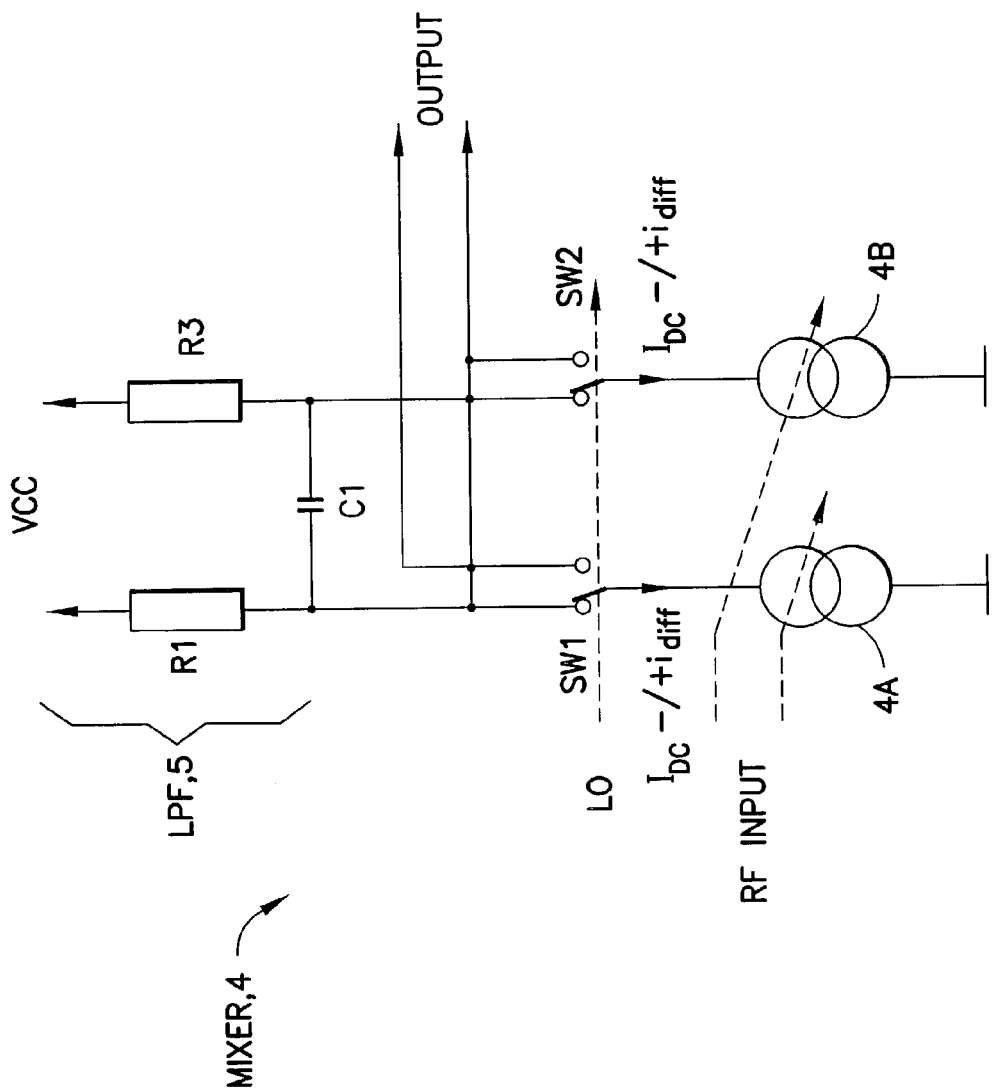
FIG. 2A is a simplified schematic diagram of a prior art embodiment of the mixer and low pass filter shown in FIG. 1.
Figure 2C:
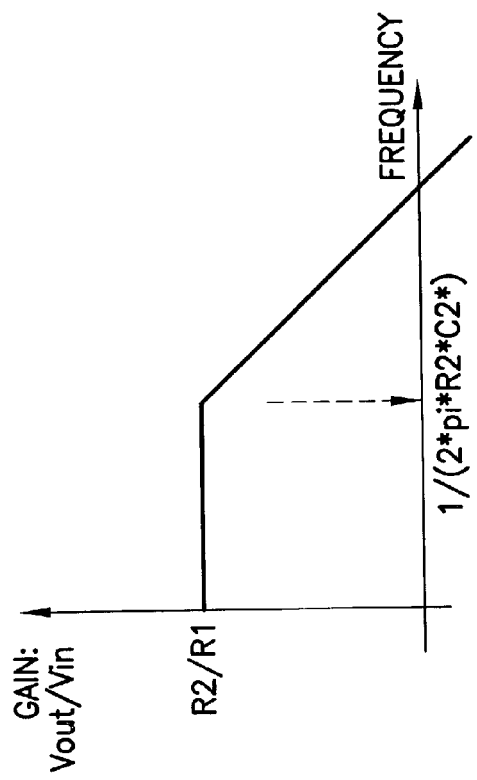
FIG. 2C shows the roll-off in gain as a function of frequency.
Figure 2B:
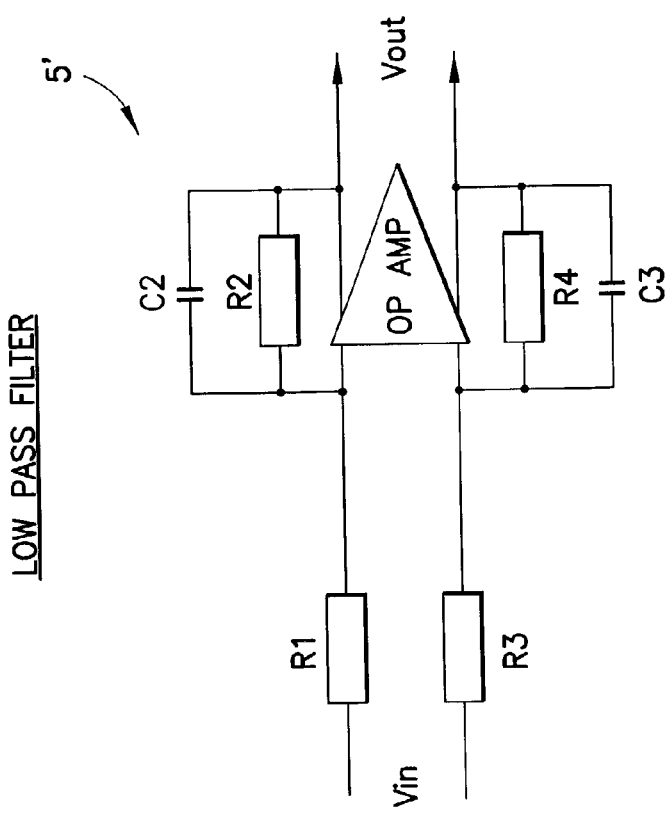

Note that in this embodiment, and contrasting same with the prior art shown in FIG. 2B, the normal input port (left sides of R1 and R3) is connected to VCC (thereby providing common mode current $I_{DC}$), and the input signal (current mode $i_{diff}$) is applied to the inputs of the operational amplifier 5B.

Note as well that this embodiment enables to the values of R1/R3 and R2/R4 to be optimized.

Figure 4:
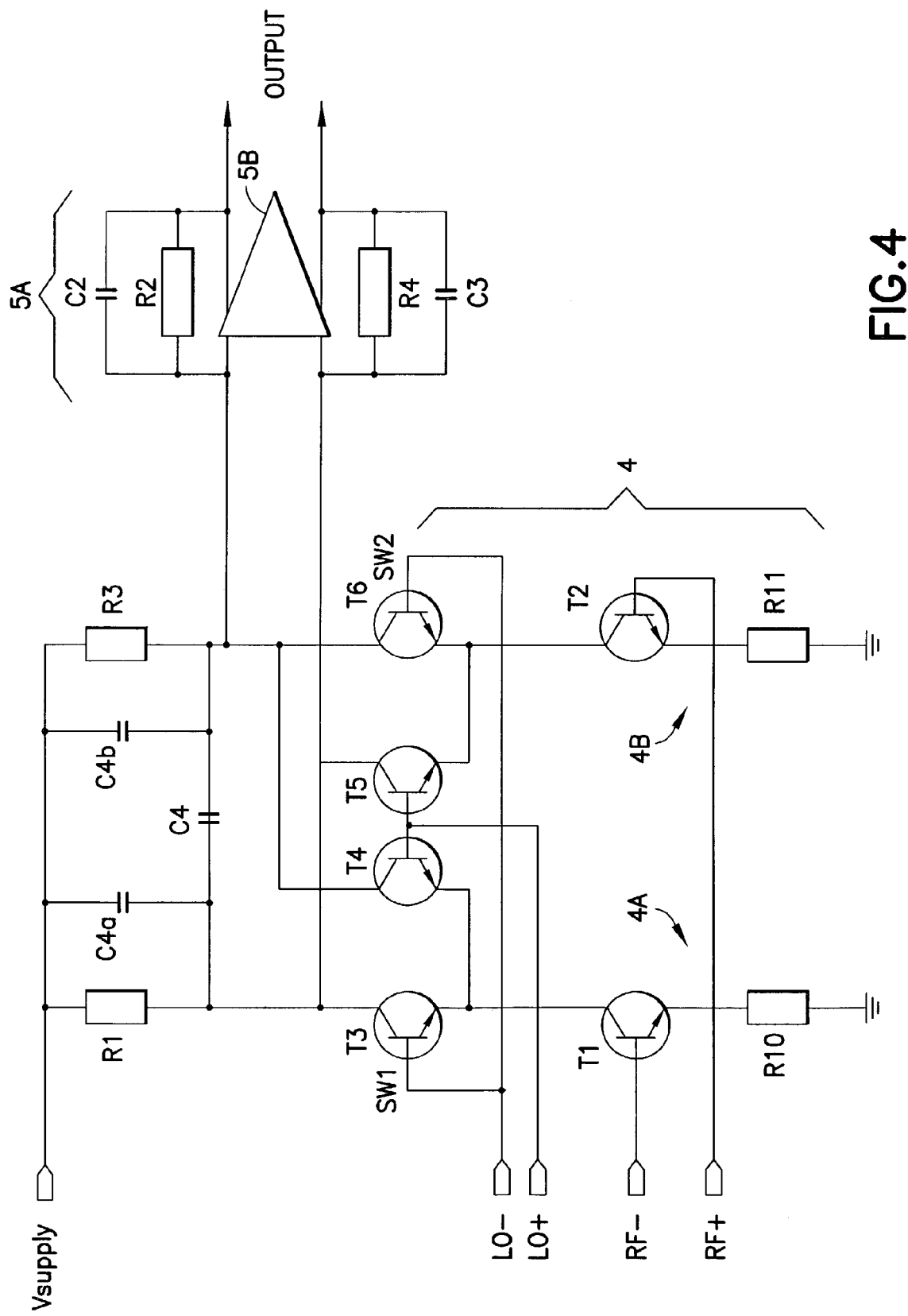
FIG. 4 is a more detailed schematic diagram of the embodiment of the mixer and low pass filter in accordance with the embodiment shown in FIG. 3.

FIG. 4 is a more detailed schematic diagram of the embodiment of the mixer 4 and the improved first LPF 5A in accordance with the embodiment shown in FIG. 3, and shows in greater detail the construction of the mixer 4 and its coupling to the LPF 5A. The mixer 4 is based on bipolar transistors, having in RF input transconductors formed by transistors T1,T2 and emitter resistors R10,R11, and a mixer 4 core comprised of transistors T3, T4, T5 and T6. The differential outputs from the LNA 3 (RF+, RF−) are coupled to the bases of NPN transistors T1 and T2, respectively, which are connected through their emitters to ground through resistances R10 and R11, respectively. The details of the biasing of T1 and T2 are not shown to simplify the drawing. The collectors of T1 and T2 are connected to the emitters of differential transistor pairs T3, T4 and T5, T6, respectively, having their base terminals connected to the differential LO input signals LO+ and LO− as shown. Load resistances R1 and R3 are connected between the collectors of T3, T5 and T4, T6, respectively, and the positive voltage supply VCC. The inputs to the op amp 5B are connected between R1 and R3 and the collectors of T3, T5 and T4, T6, respectively. An additional capacitance, C4, is connected between the inputs to op amp 5B to serve as a filter for removing high frequency mixing components. The value of C4 can be small, as filtering is provided for only very high frequencies. C4 may also be implemented as two capacitances, shown in dashed outline as C4A and C4B, placed in parallel with R1 and R3, respectively. The combination of C4, C4A and C4B can be used together if desired, or C4 may be eliminated. If present, the combination of C4 and the op amp 5B functions beneficially to attenuate higher frequency signals at the output of the mixer 4, as the op amp 5B has a finite frequency response and may not itself adequately attenuate the higher frequency signals. In any case, the amplified and filtered mixer output signal is provided at the output of op amp 5B.

In the improved active LPF 5A shown in FIGS. 3 and 4 the low pass corner frequency is inversely proportional to the product of R2 and C2, assuming that R4=R2 and C3=C2. However, since R2 is not in series with the positive voltage supply, as is R1 in FIG. 1, it can be made large in value, enabling the value of C2 to be made small, thereby conserving integrated circuit area when fabricating C2 on-chip.

Representative and non-limiting values for the components shown in FIGS. 3 and 4 are as follows: R1=R3=500 ohms, C4=20 pF, R2=R4=20 kohms and C2=C3=50 pF. By contrast, representative component values for the prior art circuit solution shown in FIG. 2A are as follows: R1=R2=500 ohms, and C1=1 nF. The significant reduction in the total capacitance value, 120 pf vs. 1000 pf, results in the realization of the benefits discussed above, such as the decrease in required circuit area to implement the DCR 1 in an integrated circuit embodiment. Relatedly, since the capacitance values are in the range of tens of picofarads, the capacitors can be implemented on-chip, and additional pins are not required to be provided for connecting to an external discrete capacitance. Note as well that the operation of the mixer 4 and the LPF is improved through the use all integrated components, as better matching and reproducibility is achieved as compared to the use of discrete components, and parasitics related to the presence of external integrated circuit pins can be eliminated. In addition, the signal level at the mixer 4 output (input to op amp 5B) is attenuated, enabling a reduction in the power supply voltage and/or a more linear signal range at the input to the mixer 4.

Reference was previously made to the publication entitled: "A 1.5 GHz Highly Linear CMOS down conversion mixer", IEEE Journal of Solid State Circuits, J. Crols et al., Vol. 30, No. 7, July 1995, for describing a CMOS mixer topology that uses two additional capacitors added to the conventional CMOS lowpass filter structure and a low frequency operational amplifier as an output amplifier.

As can be appreciated in light of the foregoing description of this invention, the mixer of Crols et al. differs significantly from the mixer 4, as the mixer of Crols et al. operates in the MOSFET triode region as opposed to the mixer 4 which employs a mixing core that switches the input currents introduced by the transconductance stage. That is, the prior art mixing transistors of Crols et al. operate with the RF and LO signals both in the voltage mode, whereas the mixing core of mixer 4 operates with the RF signal in the current mode and the LO signal in voltage mode. The mixer of Crols et al. also does not employ the resistors R1 and R3, which provide a relatively high DC current through the transistors of the mixer core (T3, T4, T5, T6) and the transconductance stage (T1 and T2).

Figure 5:
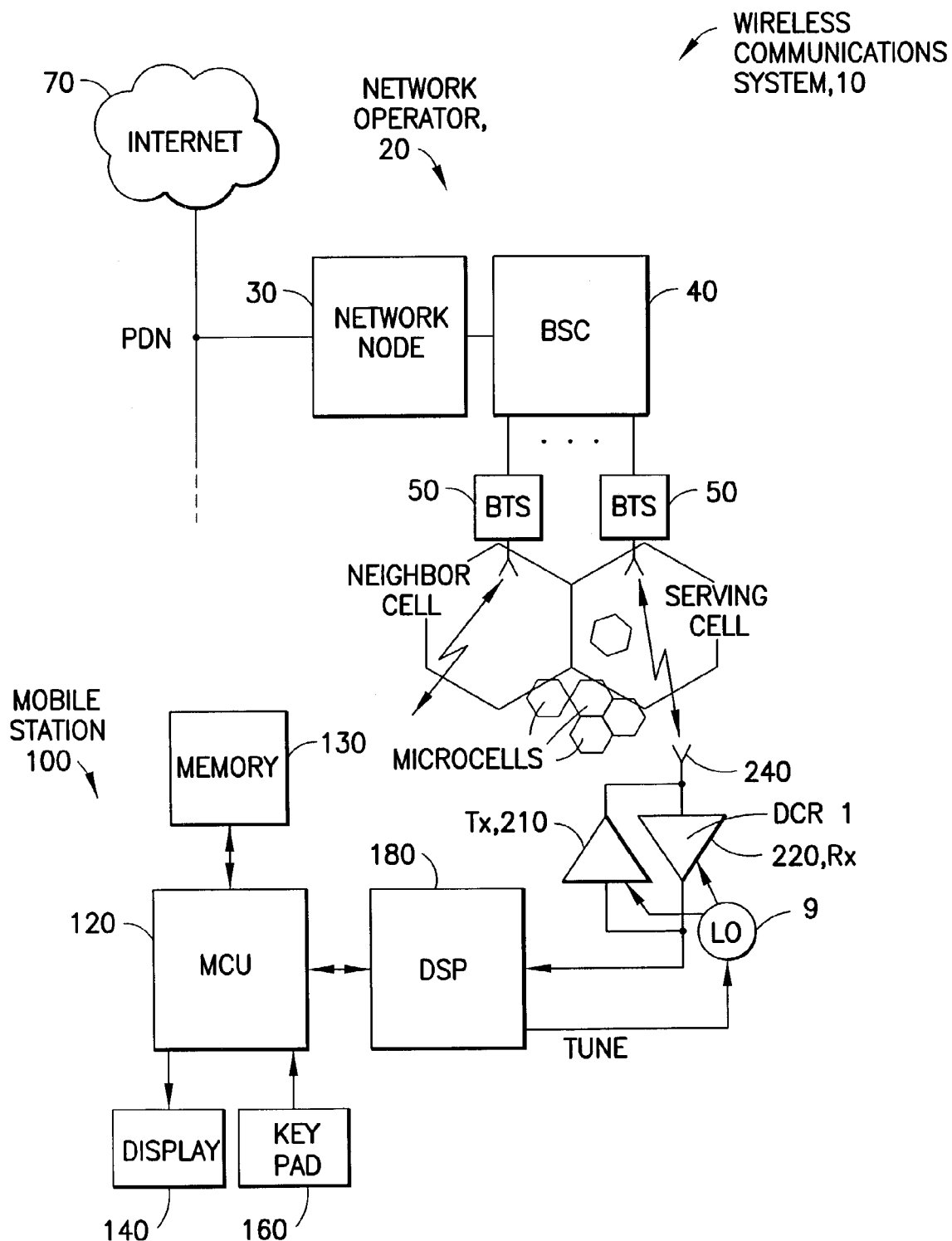
FIG. 5 is a block diagram of an embodiment of a wireless communications system that includes a mobile station having the improved direct conversion receiver illustrated in FIGS. 3 and 4.

An example of the use of the improved DCR 1 is shown in FIG. 5, which illustrates a simplified block diagram of an embodiment of a wireless communications system that is suitable for practicing this invention. The wireless communications system includes at least one mobile station (MS) 100. FIG. 5 also shows an exemplary network operator 20 having, for example, a network node 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. Communications may occur in macrocells or in microcells, depending on the nature of the network operator 20. The air interface standard can conform to any suitable standard or protocol, and may enable both voice and data traffic, such as data traffic enabling Internet 70 access and web page downloads.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. The ROM may store a program enabling the MCU 120 to provide a suitable user interface (UT), via display 140 and keypad 160, with a user. Although not shown, a microphone and speaker may be provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to at least one antenna 240 for communication with the network operator 20.

Figure 1:
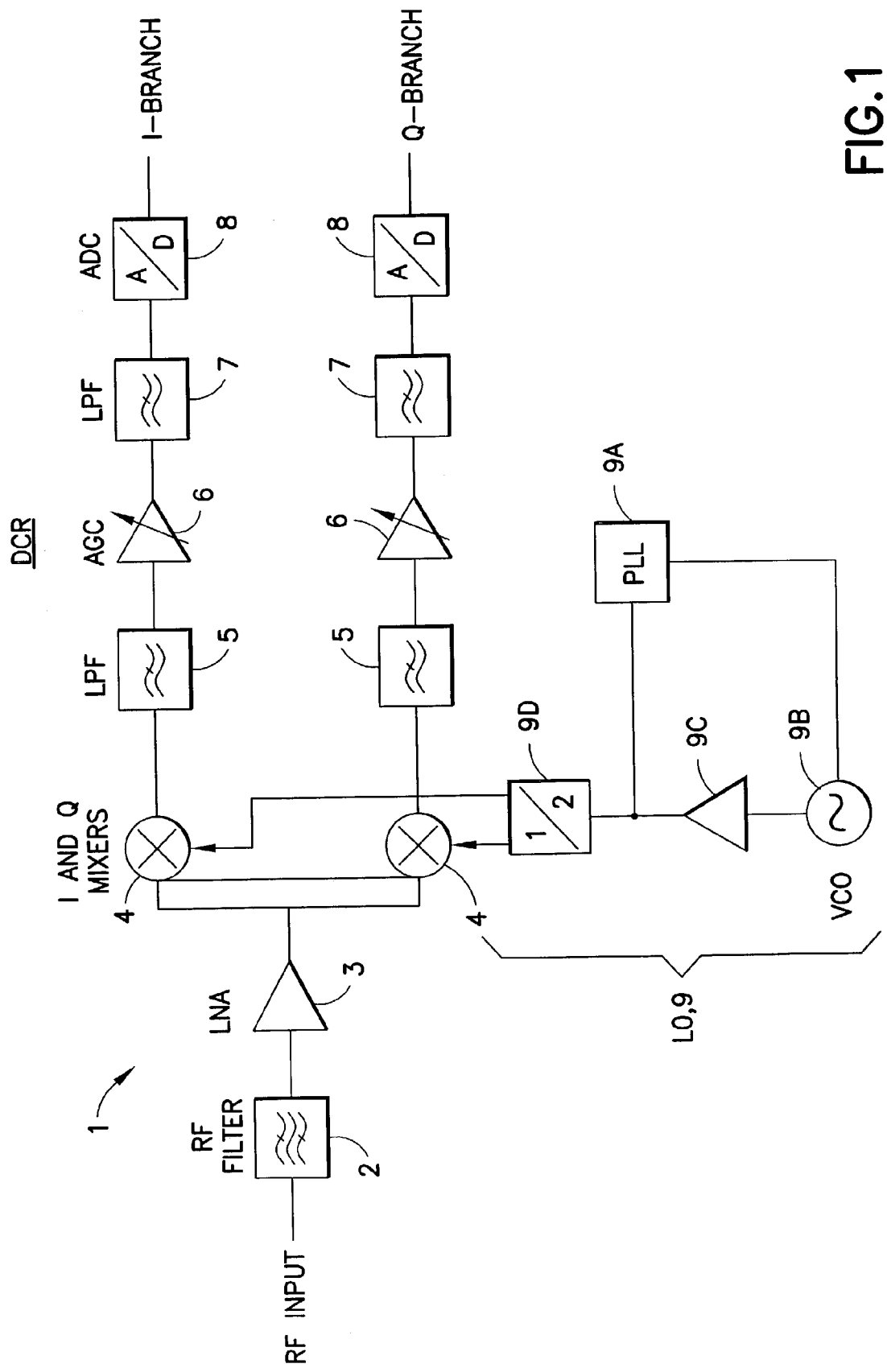
FIG. 1 is a simplified schematic diagram that illustrates a prior art example of a direct conversion receiver.

In the presently preferred embodiment the receiver 220 is constructed to contain a DCR of a type generally shown in FIG. 1, but modified to include the improved LPF 5A shown in FIGS. 3 and 4. At least one local oscillator (LO) 9, as shown in FIG. 1, is provided for tuning the transceiver, in particular the DCR 1. Data, such as digitized voice, and packet data, is transmitted and received through the antenna 240.

While these teachings have been particularly shown and described with respect to preferred embodiments thereof, it will be understood by those skilled in the art that changes in form and details may be made therein without departing from the scope of this invention. For example, while described above in the context of a DCR that employs differential signals, single ended signal embodiments are also within the scope of these teachings. Also, these teachings can be employed in DCR embodiments that do not provide in-phase and quadrature channels, but only a single channel. This invention can be employed in DCR embodiments that generate a zero Hz (DC) down-converted signal, as well as in DCR embodiments known as low IF architectures where the down-converted signal is not a DC signal (e.g., one having a frequency a few hundred Hertz or more). Furthermore, this invention is not to be construed to be limited to the specific component values that were given above by way of illustration. In addition, all of the components (resistors and capacitors) can be made adjustable or trimmable in order to enable the corner frequency to be adjusted to the required tolerances. Furthermore, this invention can be realized with a transconductance stage and a switching mixer that are implemented with any of a number of device technologies including, but not limited to, bipolar, MOSFET and MESFET. Thus, this invention should be construed as having a scope commensurate with the scope of the appended claims, and equivalents thereof.

What is claimed is:

1. A direct conversion receiver comprising a down-conversion current switching mixer comprising a first input node for receiving an RF signal, a second input node for receiving a local oscillator signal for mixing with the RF signal and an output node coupled to an input of an amplifier forming a low pass filter having a low pass pole generated by a resistor R and a capacitor C coupled in parallel in a feedback path of said amplifier, said output node further being coupled to a power supply voltage through load resistances.

2. A direct conversion receiver as in claim 1, where a low pass corner frequency of said low pass filter is inversely proportional to the product of R and C.

3. A direct conversion receiver as in claim 1, where said down-conversion mixer operates as a differential signal down-conversion mixer having a pair of first input nodes, a pair of second input nodes, and first and second output nodes, further comprising a capacitance coupled between said first and second output nodes.

4. A direct conversion receiver as in claim 1, where said down-conversion mixer operates as a differential signal down-conversion mixer having a pair of first input nodes, a pair of second input nodes, and first and second output nodes coupled to a power supply through first and second load resistors, respectively, further comprising a first capacitance coupled in parallel with said first load resistor and a second capacitance coupled in parallel with said second load resistor.

5. A direct conversion receiver as in claim 4, further comprising a third capacitance coupled between said first and second output nodes.

6. A direct conversion receiver as in claim 1, where said down-conversion mixer operates as a differential signal down-conversion mixer having a pair of first input nodes, a pair of second input nodes, and first and second output nodes coupled to a power supply through first and second load resistors, respectively, further comprising a capacitance coupled between said first and second output nodes.

7. A direct conversion receiver as in claim 1, where said down-conversion mixer and said low pass filter are implemented as part of an integrated circuit, where said resistor and said capacitor are fabricated within said integrated circuit.

8. A direct conversion receiver as in claim 1, where an output node of said low pass filter is coupled to an input node of an automatic gain control circuit.

9. A wireless communications mobile station comprising at least one antenna and a RE transceiver comprised of a direct conversion receiver coupled to said antenna, said direct conversion receiver comprising a low noise amplifier for amplifying a received RE signal and for outputting said amplified RF signal to a down-conversion current switching mixer comprising a first input node for receiving said amplified RE signal, a second input node for receiving a local oscillator signal for mixing with said amplified RE signal and an output node coupled to an input of a low pass filter, said output node further being coupled to a power supply voltage through a load resistance, said low pass filter having a low pass pole generated by an amplifier having a resistor R and a capacitor C coupled in parallel in a feedback path of said amplifier, where a low pass corner frequency of said low pass filter is inversely proportional to the product of R and C.

10. A wireless communications mobile station as in claim 9, further comprising at least one capacitance coupled to said output node of said down-conversion mixer for attenuating higher order mixing frequencies output from said down-conversion mixer.

11. A wireless communications mobile station as in claim 9, where said direct conversion receiver comprises an in-phase (I) branch and a quadrature (Q) branch following said low noise amplifier, and where each of said I and Q branches comprise one of said down-conversion mixers and one of said low pass filters.

12. A wireless communications mobile station as in claim 9, where said down-conversion mixer operates as a differential signal down-conversion mixer having a pair of first input nodes, a pair of second input nodes, and first and second output nodes coupled to first and second input nodes of said low pass filter, and where said amplifier comprises an operational amplifier that has an RC pair coupled in parallel between an output node of said operational amplifier and said first input node of said low pass filter and has another RC pair coupled in parallel between said output node of said operational amplifier and said second input node of said low pass filter.

13. A method of operating a direct conversion receiver integrated circuit, comprising:
    amplifying an input RF signal;
    down-converting said amplified RF signal to a down-converted signal using a current switching mixer having an input transconductor stage for receiving said amplified RF signal, where the mixer processes the amplified RF signal in the current mode and processes a local oscillator signal in the voltage mode; and
    low pass filtering said down-converted signal with an active low pass filter having a low pass pole generated by an amplifier having a resistor R and a capacitor C coupled in parallel in a feedback path of said amplifier, where a low pass corner frequency of said low pass filter is inversely proportional to the product of R and C.

14. A method as in claim 13, where said current switching mixer operates as a differential signal down-conversion mixer having a pair of first input nodes, a pair of second input nodes, and first and second output nodes coupled to first and second input nodes of said active low pass filter, and where said amplifier comprises an operational amplifier that has an RC pair coupled in parallel between an output node of said operational amplifier and said first input node of said low pass filter and has another RC pair coupled in parallel between said output node of said operational amplifier and said second input node of said low pass filter.

15. A receiver circuit for use in a mobile station, comprising a Gilbert Cell mixer that receives an RF signal to be mixed with a local oscillator signal, said Gilbert Cell mixer having first and second outputs connected to first and second inputs, respectively, of an operational amplifier for providing differential currents $i_{diff}$ to said first and second inputs of said operational amplifier, said first and second inputs of said operational amplifier being connected to a supply voltage through first and second resistances, respectively, and receiving common mode currents $I_{DC}$ therefrom, said operational amplifier having a first parallel RC network coupled between a first output node of said operational amplifier and said first input and has a second parallel RC network coupled between a second output node of said operational amplifier and said second input, said operational amplifier and said first and second parallel RC networks forming a low pass filter at said first and second outputs of said Gilbert Cell mixer.

16. A receiver circuit as in claim 15, where said first and second outputs of said Gilbert Cell mixer are connected to virtual ground nodes of said operational amplifier.

17. An integrated circuit for use with a radio frequency receiver and comprising a down-conversion current switching mixer comprising a first input node for coupling to a radio frequency signal, a second input node for coupling to a local oscillator signal for mixing with the radio frequency signal and an output node for coupling to an input of an amplifier that comprises a portion of a low pass filter having a low pass pole generated by a resistance R and a capacitance C coupled in parallel in a feedback path of said amplifier, said output node further for being coupled to a power supply voltage through a load resistance.

18. An integrated circuit as in claim 17, where said down-conversion mixer operates as a differential signal down-conversion mixer having a pair of first input nodes, a pair of second input nodes, and first and second output nodes, further comprising a capacitance coupled between said first output nodes and said second output node.

19. An integrated circuit as in claim 17, where said down-conversion mixer operates as a differential signal down-conversion mixer having a pair of first input nodes, a pair of second input nodes, and first and second output nodes for coupling to a power supply through first and second load resistors, respectively, further comprising a first capacitance coupled in parallel with said first load resistor and a second capacitance coupled in parallel with said second load resistor.

20. An integrated circuit as in claim 17, where said resistance and said capacitance are fabricated within said integrated circuit.

* * * * *

UNITED STATES PATENT AND TRADEMARK OFFICE
CERTIFICATE OF CORRECTION

PATENT NO. : 7,062,248 B2
APPLICATION NO. : 10/345659
DATED : June 13, 2006
INVENTOR(S) : Kuiri It is certified that error appears in the above-identified patent and that said Letters Patent is hereby corrected as shown below:

In Claim 9: line 58, "RE" should be deleted and -- RF -- inserted;

In Claim 9, line 61, "RE" should be deleted and -- RF -- inserted;

In Claim 9, line 64, "RE" should be deleted and -- RF -- inserted;

In Claim 9, line 65, "RE" should be deleted and -- RF -- inserted.

Signed and Sealed this

Seventeenth Day of October, 2006

JON W. DUDAS
*Director of the United States Patent and Trademark Office*